United States Patent [19]

Lin et al.

[11] Patent Number: 4,973,956

[45] Date of Patent: Nov. 27, 1990

[54] CROSSBAR SWITCH WITH DISTRIBUTED MEMORY

[75] Inventors: Wen-Tai Lin; Jyh-Pin Hwang, both of Schenectady, N.Y.

[73] Assignee: General Electric Company, Schenectady, N.Y.

[21] Appl. No.: 288,374

[22] Filed: Dec. 22, 1988

[51] Int. Cl.[5] .............................................. H04Q 1/00
[52] U.S. Cl. .......................... 340/825.86; 340/825.79; 340/825.85; 340/825.89; 340/825.91; 379/292
[58] Field of Search ...................... 340/825.86, 825.85, 340/825.87, 825.89, 825.90, 825.91, 825.93, 825.79, 825.83; 307/241, 571, 239, 573, 231; 379/280, 291, 292, 9, 10, 15, 16, 17; 365/230.08, 189.01, 189.04

[56] References Cited

U.S. PATENT DOCUMENTS 4,785,299  11/1988  Trumpp .............................. 379/292
4,807,184   2/1989  Shelor ............................ 340/825.89

OTHER PUBLICATIONS

"A Dynamically Reconfigurable Interconnection Chip" CY Chin. W-T Lin, J-P Hwang, S. Chu, G. Forman, R. Dunki-Jacobs, S. Karr J. Mallick, H. T. Kung, A. Sussman, F. H. Hsu, T. Nishizawa, ISSCC 87-Friday, Feb. 27, 1987, General Corp. Res. & Dev. Schenectady, NY-pp. 276–277 & 425.

Primary Examiner—Donald J. Yusko
Assistant Examiner—Dervis Magistre
Attorney, Agent, or Firm—Allen L. Limberg; James C. Davis, Jr.; Marvin Snyder

[57] ABSTRACT

A crossbar switch is constructed in monolithic integrated circuit form together with respective memory cells controlling each of the component crosspoint switches in the crossbar switch. The memory cells permit control signals for the crosspoint switches to be supplied serially to the monolithic integrated circuit and thus permit those control signals to be supplied in coded form as orthogonal cross addressing for the memory cells. This reduces the number of bits which must be provided in parallel to the integrated circuit for controlling the crosspoint switches. In preferred embodiments of the crossbar switch, provision is made for operation as a corner-turn array for rotating bit matrices and for faster operation as a barrel shifter.

32 Claims, 9 Drawing Sheets

CROSSBAR SWITCH WITH DISTRIBUTED MEMORY

The present disclosure relates to crossbar switches as may be used, for example, in networks for linking parallel processors in computers.

BACKGROUND OF THE INVENTION

In recent research concerning computer architectures wherein a plurality of processors or component computers are operated in parallel to achieve high rates of throughput, much of the effort has concerned the integration of a network of busses for interconnecting the parallel processors. The processors are either tightly or loosely coupled, depending upon whether or not they share memory and operating tasks. Among tightly coupled computers crossbar switch networks provides better interconnections than do multi-stage networks of any other type presently known.

Two approaches have been taken in the prior art with regard to constructing crossbar switch networks in monolithic integrated circuitry. One has been to construct a 2-crosspoint-by-2-crosspoint network in each of a plurality of bit slices on each integrated circuit to be used with a number of similar crossbar switch network component integrated circuits. This approach requires $N^2/4$ integrated circuits to form an N-crosspoint-by-N-crosspoint crossbar switch network and demands the order of N in number of routing stages for each connection. The other approach has been to construct an N-crosspoint-by-N-crosspoint crossbar switch network in one or more bit slices on each integrated circuit.

There are practical constraints on N when the latter approach is taken. The area of the integrated circuit tends to grow at the rate of $N^2$, where N is the number of output ports as well as the number of input ports. The limitation upon the size of N normally is not imposed by this area increase, but rather upon the slower linear rate of increase in the perimeter of the integated circuit die, which limits the number of connections it is practical to make to it. The crossbar switch arranges for each of its output ports to connect to one of its input ports, one of which "input ports" may be just non-connection to any of $(N-1)$ actual input ports. Since one (or none) of the N crosspoint switches associated with each output port can be specified by a digital code of $\log_2 N$ bits, N $\log_2$ N pins are required to be able to select in real time the crosspoint switch for each of the N output ports. Crossbar switches with 256 crosspoint switches requiring sixteen input data pins, sixteen output data pins and sixty-four control pins have been about as large as is practical to realize with integrated circuit packages now available.

It is desirable to construct crossbar switches with a larger number of crosspoints on each integrated circuit die, such that it is the limitation of the $N^2$ rate of increase in die area rather than the limitation on "pin-out" (i.e., the limitation on the number of pins) that determines the maximum number of network crosspoints per die. Being able to do this is based in large part on there being a way to reduce pin-out requirements. Inter-die electrical connections provided by pin-out to a printed-circuit board and pin-in from a printed-circuit board are generally more costly and less reliable than intra-die electrical connections.

An approach that has been taken to reduce pin-out requirements is to include a control pattern memory on the same integrated circuit with the crossbar switch for storing ($N\log_2 N$)-bit selection signals for the crossbar switch. This was done in the LINC integrated-circuit described by C-Y Chin, the present inventors and others in the paper "A Dynamically Reconfigurable Interconnection Chip" presented publicly Feb. 27, 1987 and reported on pages 276, 277 and 425 of the *Digest of Technical Papers*, 1987 *IEEE International Solid-State Circuits*. Each of the N output ports of the crossbar switch can connect to any of its N input ports (one of which input ports may be first non-connection to any of the other input ports), so there are N permutations per output port that can combine with a previous set or previous sets of those permutations, so there are $N^N$ possible patterns for connection by the crossbar switch. If all $N^N$ possible control patterns for generating such crossbar switch connections were stored in memory, $N\log N$ bits would be required to code all possible addresses of the memory locations storing these $N^N$ control patterns. This would provide no saving in pin-out. Furthermore, the memory having $N^N$ locations each storing an $N\log_2 N$ bit pattern would have to have $N^{(N-1)}\log_2 N$ bit storage capability, which is substantially large for N larger than sixteen. This approach has been taken, however, when the number of possible interconnection patterns can be restricted to substantially fewer than $N^N$. For example, in a barrel shifter there are only N interconnection patterns of interest. Memory size is only $N^2\log_2 N$ bits, and only $\log_2 N$ bits are needed to address each of the N possible patterns in the pattern memory.

In the LINC integrated-circuit the control pattern memory is divided into two banks that can be selectively conditioned, one for reading from and the other for writing into, to allow control pattern memory updating without having to interrupt data flow through the crossbar switch. The writing of memory is done N parallel bits at a time in the LINC integrated-circuit described in the February 1987 ISSCC paper, N being eight.

The inclusion of memory for controlling the crosspoint switches in a monolithic integrated circuit permits time-division multiplexing of write-input signal to the memory with data processing functions, the inventors point out. This allows reflexing of the write-input signal of the memory through a data port or data ports of the integrated circuit, so that the pin count of the die need not increase to include further pins for writing memory. Reflexing of the memory write input could be wholly or in part through the N-bit-wide output data port of the integrated crossbar switch, but low-output-impedance output data buffer amplifiers tend to make this difficult. Preferably, reflexing of the memory write is done entirely through the N-bit-wide input data port of the integrated crossbar switch. Such reflexing is not difficult to do despite the use of input data buffer amplifiers, since these amplifiers are usually high-input impedance types. (Indeed, reflexing may be done after rather than before the input data buffer amplifiers, if one so chooses).

The size of the memory needed to control the connection patterns of the crosspoint switches is reduced to a minimal $N^2$ bits in accordance with the invention by assigning a respective single-bit storage location in memory to each crosspoint switch. This eliminates the need for control pattern decoders between memory and the crosspoint switches, a requirement in the LINC integrated circuit. Just the $N^2$ bits of memory allow the storage of all possible interconnection patterns in the crossbar switch. The ($N^2$)-bit memory is "square" and is invariably addressable using two orthogonal addresses of similar bit-width, while the prior art control pattern memories often may not be "square", making it more difficult to address them efficiently.

The trade-off in performance is that the updating of connection patterns is slower in the one-storage-location-per-crosspoint (or $N^2$-bit) memory than in the larger connection pattern memory if the new connection pattern is any arbitrary one that does not lend itself to updating the memory on an N-parallel-bits basis. However, in many instances changes in the routing of digital sampled-data signals through a crossbar switch network occur relatively rarely as compared to sampling rate. The conditions of the cross-point switches then do not need to be modified all at one time, but may instead be modified sequentially using row-and-column addressing of the switches. Row-and-column addressing, or addressing with any other two orthogonal variables descriptive of cross-point location, requires only 2 $\log_2 N$ control pins since location can be coded for both dimensions of memory addressing. In many applications both of the two orthogonal addresses of similar $\log_2 N$ bit-width may be introduced into the integrated circuit through the same pins on a time-division-multiplexed basis, the inventors point out. For changes of connection of only one output port at an isolated time, the slower nature of updating the crossbar connection pattern from $N^2$-bit memory will not manifest itself. Also arrangements can be made to change between certain patterns of interconnection without the slower nature of updating from $N^2$-bit memory manifesting itself.

There are specialized applications of crossbar switches in which the number of control pins can be reduced because not all patterns of output ports connecting to input ports are encountered. An example of this is the use of the crossbar switch as a programmable barrel-shifter, which is described in detail further on in the specification, which allows the number of control pins to be reduced to the order of $\log_2 N$ in number.

It is useful to distribute the memory used for controlling the crosspoint switches in the integrated circuit. By associating a respective single-bit storage cell in memory with each cross-point switch being controlled, so that each addressable storage cell controls the switching of the cross-point switch with which it is associated, and locating each set of associated elements within the confines of a respective one of close-packed cells, the integrated circuitry becomes regular in its pattern. Therefore, layout can be done on a step-and repeat basis, which facilitates the layout of crossbar switches using a silicon compiler.

SUMMARY OF THE INVENTION

The invention in a principal one of its aspects is embodied in a crossbar switch included in a monolithic integrated circuit wherein each component crosspoint switch is controlled by a respective single-bit storage cell of an addressable memory for control conditions, which memory is included in the same monolithic integrated circuit.

DETAILED DESCRIPTION

Figure 1:
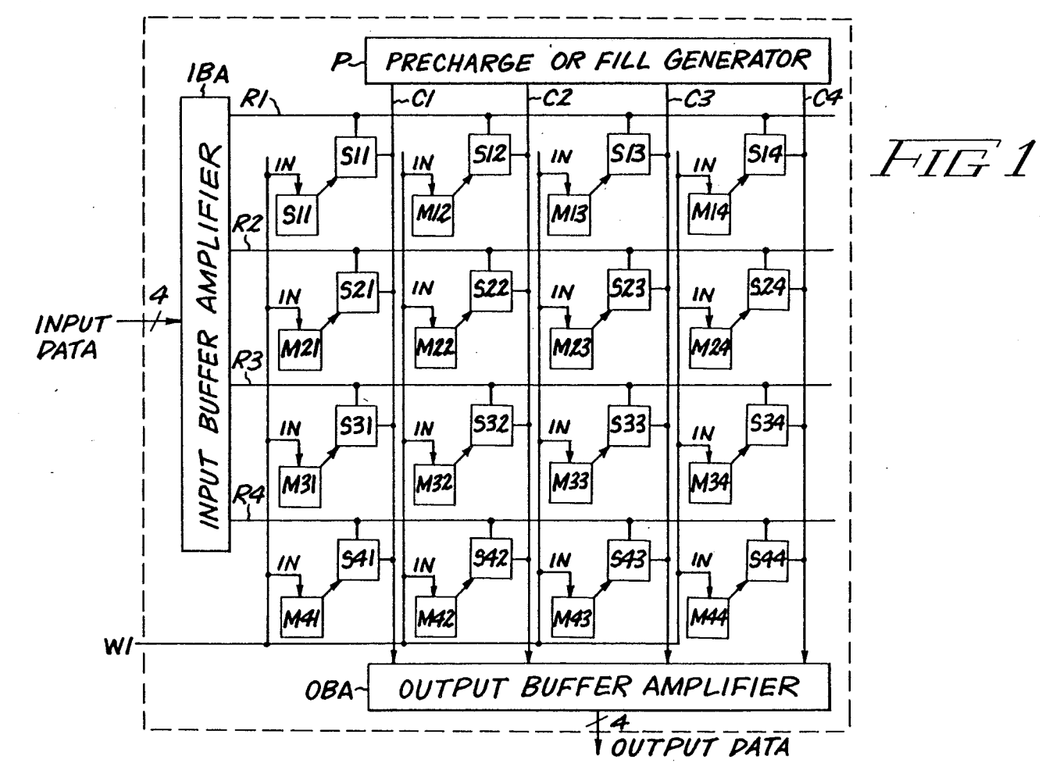
FIG. 1 is a general schematic diagram of a crossbar switch embodying the invention, which crossbar switch includes within the confines of a single monolithic integrated circuit an array of crosspoint switches and a memory for controlling the conditions of these crosspoint switches.

The FIG. 1 crossbar switch constructed within the confines of a monolithic integrated circuit IC has four row signal busses R1, R2, R3 and R4 for receiving respective bit places of the parallel bit output signal of an input buffer amplifier IBA and has four column signal busses C1, C2, C3 and C4 for supplying respective bit places of the parallel-bit input signal of an output buffer amplifier OBA. The FIG. 1 crossbar switch is a four-by-four (crosspoint) crossbar switch having sixteen crosspoint switches and sixteen single-bit memories for supplying respective ones of those crosspoint switches with control signals. Crosspoint switches S11, S12, S13 and S14 selectively connect row signal bits R1 to column busses C1, C2, C3 and C4, respectively, as controlled by single-bit read output signals from memories M11, M12, M13 and M14, respectively, associated with those switches. S21, S22, S23 and S24 selectively connect row signal bus R2 to column signal busses C1, C2, C3 and C4 respectively as controlled by single-bit read output signals from memories M21, M22, M23 and M24, respectively. S31, S32, S33 and S34 selectively connect row signal bus R3 to column signal busses C1, C2, C3 and C4, respectively, as controlled by single-bit read output signals from memories M31, M32, M33 and M34, respectively. S41, S42, S43 and S44 selectively connect row signal bus R4 to column signal busses C1, C2, C3 and C4, respectively, as controlled by single-bit read output signals from memories M41, M42, M43 and M44, respectively. The crosspoint switches S11, S12, S13, S14, S21, S22, S23, S24, S31, S32, S33, S34, S41, S42, S43, S44 will hereinafter be collectively identified as crosspoint switches S11, . . . S44. Similarly, the memories M11, M12, M13, M14, M21, M22, M23, M24, M31, M32, M33, M34, M41, M42, M43, M44 will hereinafter be collectively identified as memories M11, . . . M44. A pre-charge, or fill, generator P applies a predetermined bit condition, usually a ONE, to each of the column signal busses C1, C2, C3 and C4 absent the column signal bus having its bit condition determined by any one of the crosspoint switches S11, . . . S44 connecting one of the row signal busses R1, R2, R3, R4 to it. Each ONE so applied to a column signal bus is complemented to a ZERO by a logic inverter for that column signal bus, which logic inverter is included in output buffer amplifier OBA.

The four-by-four crossbar switch of FIG. 1 is representative of larger crossbar switches embodying the invention, such as 16-by-16 crossbar switches of the largest size commonly used at the time of invention. More importantly the FIG. 1 crossbar switch is representative of still larger (e.g., 256-by-256) crossbar switches that embody the invention and would be impractical to make but for the invention.

The distinctive feature of the FIG. 1 crossbar switch is the respective single-bit memory associated with each crosspoint switch. FIG. 1 does not show apparatus for writing these memories. This matter will be considered with the help of FIGS. 2–5, each of which can be individually combined with FIG. 1 to generate a more complete schematic diagram of a respective crossbar switch.

In the initial consideration of the ways in which to write the single bit memories M11, . . . M44, all the memories may be assumed to share a common write input bus WI with single pin-out from the integrated circuit IC as illustrated in FIG. 1. Each memory is supplied a write enable pulse at a time when a signal IN on that common write input bus WI is appropriate for writing that particular memory. Rather than having to supply sixteen respective control signals to crosspoint switches S11, . . . S44 in parallel, which would require sixteen connection pins to the integrated circuit, memories M11, . . . M44 allow these respective control signals to be supplied serially through a single pin on a time-division-multiplex basis. Later on, preferred ways to write these memories will be described, but they too will depend on the memories allowing one to carry the control signals for the crosspoint switches into the integrated circuit IC in non-real time, on a time-division-multiplexed basis, so the number of connection pins is reduced.

Figure 2:
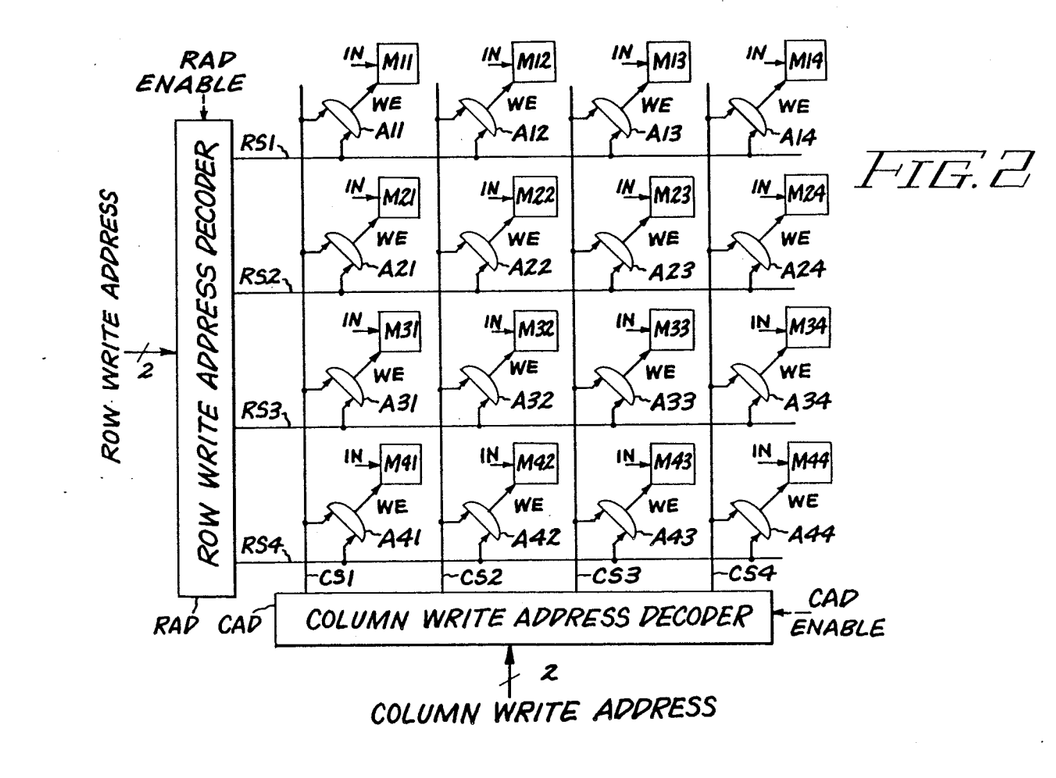
FIGS. 2, 3, 4 and 5 are each a schematic diagram showing a respective way of addressing the memory shown in the FIG. 1 (or FIG. 6) schematic diagram, as used in different specific embodiments of the invention.

FIG. 2 shows how the write enable signals for memories M11, . . . 44 may be generated responsive to row and column partial write addresses. An N-bit row partial write address can code the selection of $2^N$ rows of memory, and an M-bit column partial write address can code the selection of $2^M$ of memory. Accordingly, a two-bit row partial write address and a two-bit column partial write address can code access to selected ones of the four rows and four columns in which memories M11, . . . M444 are arrayed. During working of a memory a row partial write address decoder RAD decodes each of the four possible two-bit row partial write addresses to select a ONE to a respective one of four row select lines RS1, RS2, RS3 and RS4 and to select ZEROs to the other row select lines. Also during writing of a memory a column partial write address decodes CAD decodes each of the four possible two-bit column partial write addresses to select a ONE to a respective one of four column select lines CS1, CS2, CS3 and CS4 and to select ZEROs to the other column select lines. Each memory Mij of the memories M11, . . . M44 has associated therewith an AND gate Aij for supplying at its output port a write enable signal to its associated memory Mij, in all combinations of i being an integer 1 to 4 inclusive and j being an integer 1 to 4 inclusive. Each AND gate AXY has two input ports, one connecting to the other to row select line RSi and column select line CSj. Responsive to each row and column write address combination only a respective one of the AND gates Aij supplies a ONE as write enable signal to its associated one of the memories, M11, . . . M44. The AND gates Aij for all combinations of X being 1, 2, 3 or 4 and Y being 1, 2, 3 or 4 will be referred to collectively as A11, . . . A44 hereinafter.

When no memory is being written or rewritten, the row write address decoder may be conditioned to select ZEROs to all row select lines by withholding a RAD ENABLE signal supplied thereto during the writing or rewriting of a memory. Alternatively, the column write address decoder may be conditioned to select ZEROs to all column select lines by withholding a CAD ENABLE signal supplied thereto during the writing or rewriting of a memory, or both of the foregoing procedures may be followed.

Figure 3:
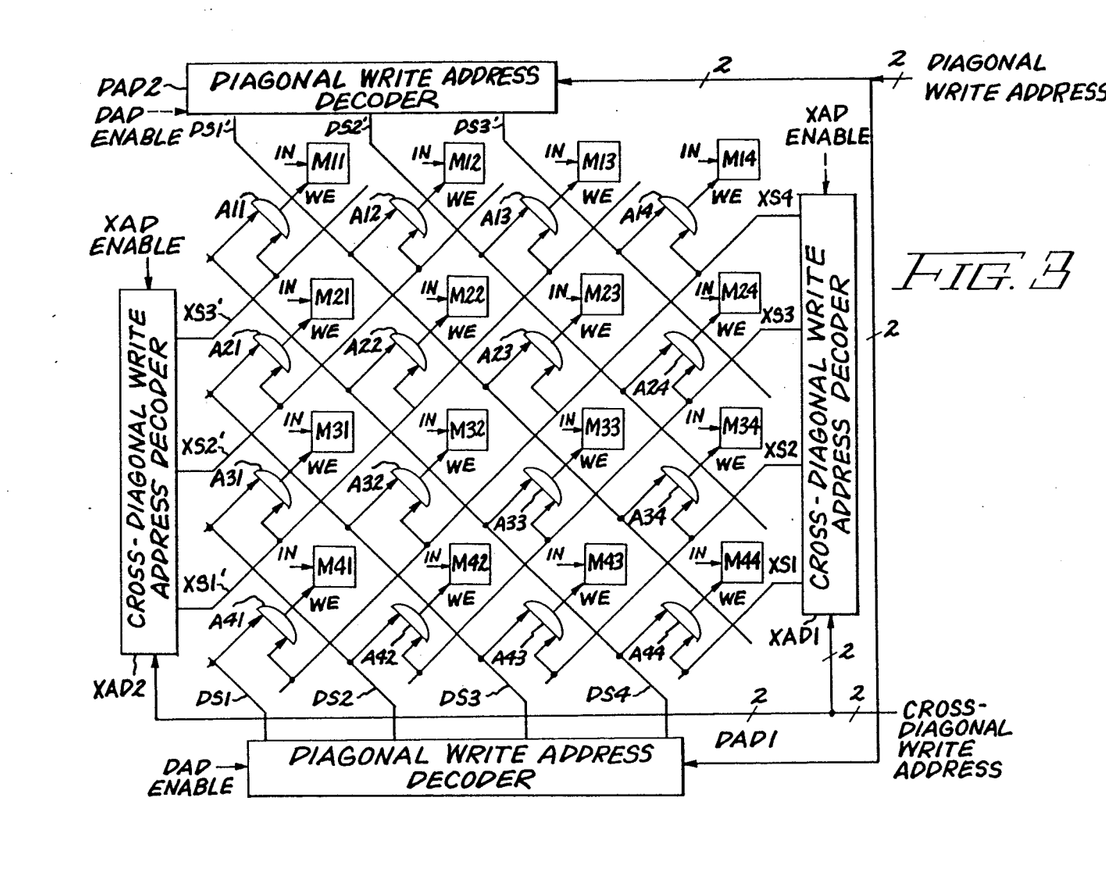

FIG. 3 shows how write enable signals for memories M11, . . . M44 may be generated responsive to diagonal and cross-diagonal partial write addresses. AND gates A11, . . . A44 connect at first input ports thereof to ones of diagonal select lines DS1, DS2, DS3, DS4, DS1', DS2' and DS3'. AND gates A11, . . . A44 connect on second input ports thereof to ones of cross-diagonal 20 select lines XS1, XS2, XS3, XS4, XS1', XS2' and XS3'. A diagonal partial address decoder DAD1 is partially replicated in a further diagonal partial address decoder DAD2. DAD1 and DAD2 decoders operate together so that a first diagonal address code places a CNE on diagonal select lines DS1 and DS1' and ZEROs on all other diagonal select lines, a second diagonal address code places a ONE on diagonal select lines DS2 and DS2' and ZEROs on all other diagonal select lines, a third diagonal address code places a ONE on diagonal select lines DS3 and DS3' and ZEROs on all other diagonal select lines, and a fourth diagonal address code places a ONE on diagonal select bus DS4 and ZEROs on all other diagonal select lines. A cross-diagonal partial address decoder XAD1 is partially replicated in a further cross-diagonal partial address decoder XAD2, XAD1 and XAD2 decoders operate together so that a first cross-diagonal address places a ONE on just cross-diagonal select lines XS1 and SX1', a second cross-diagonal address places a ONE on just cross-diagonal select lines XS2 and SX2', a third cross-diagonal address places a ONE on just cross-diagonal select lines SX3 and SX3', and a fourth cross-diagonal address places a ONE on just cross-diagonal select bus XS4. Otherwise decoders XAD1 and XAD2 place ZEROs on the cross diagonal select lines connecting from them. Responsive to each combination of diagonal and cross-diagonal partial addresses only a respective one of the AND gates A11, . . . A44 supplies a ONE as write enable signal to its associated one of the memories M11, . . . M44.

When no memory is being written or rewritten the diagonal write address decoders DAD1 and DAD2 may be conditioned to select ZEROs to all diagonal select lines by withholding a DAD ENABLE signal supplied those decoders during the writing or rewriting of a memory. Alternatively, the cross-diagonal write address decoders XAD1 and XAD2 may be conditioned to select ZEROs to all cross-diagonal select lines by withholding an XAD ENABLE signal from them, or both of the foregoing procedures may be followed.

Using decoder DAD 2 to replicate a portion of decoder DAD1 saves the need for connecting diagonal select lines DS1 and DS1' together, for connecting diagonal select lines DS2 and DS2' together, and for connecting diagonal select lines DS3 and DS3' together Such connection would in effect involve routing an N−1 conductor bus around the i-c. Decoders DAD1 and DAD2 may be constructed in distributed form with logic gates for controlling each diagonal select line decoding from a ($\log_2 N$)-conductor bus routed on chip. This ($\log_2 N$)-conductor bus can be routed in less area than an (N−1) conductor bus if N exceeds three. Using decoder XAD2 to replicate a portion of decoder XAD1 is done for similar reasons.

Figure 4:
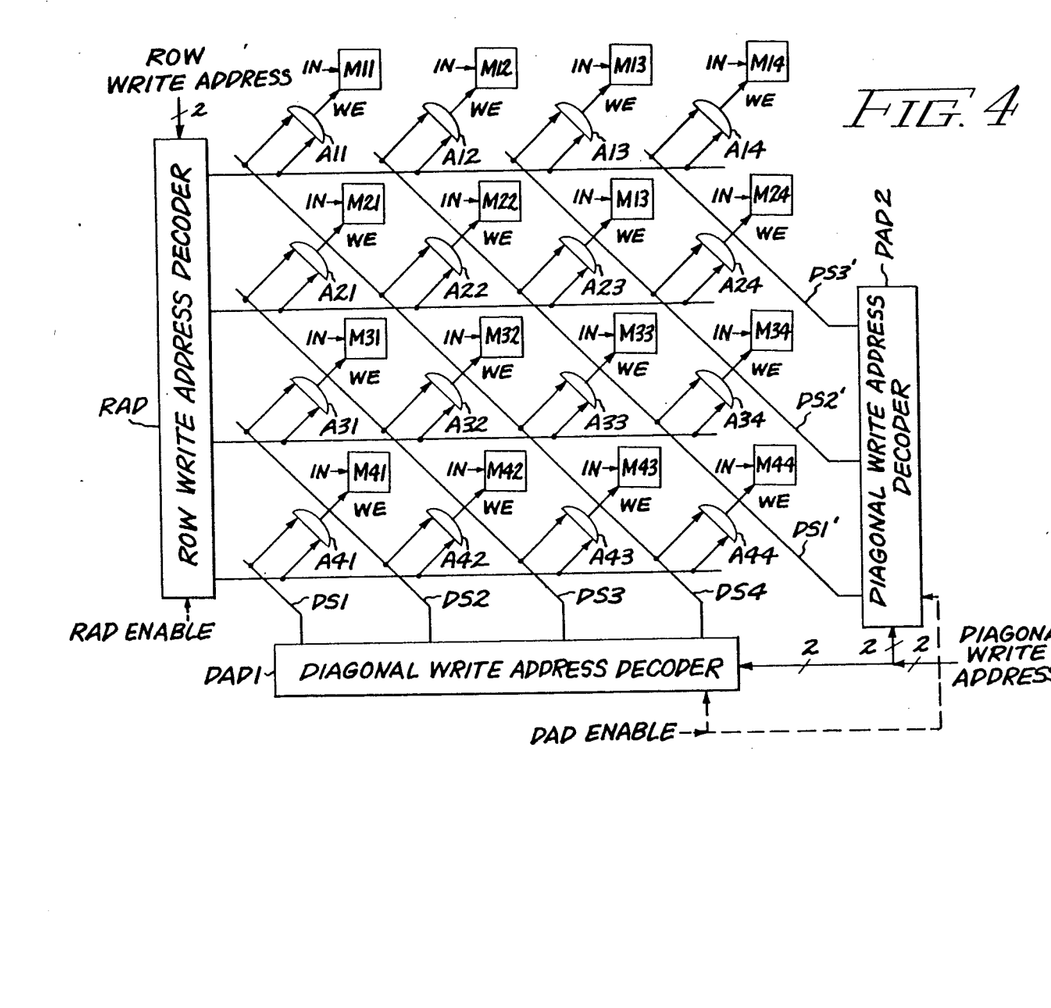
Figure 5:
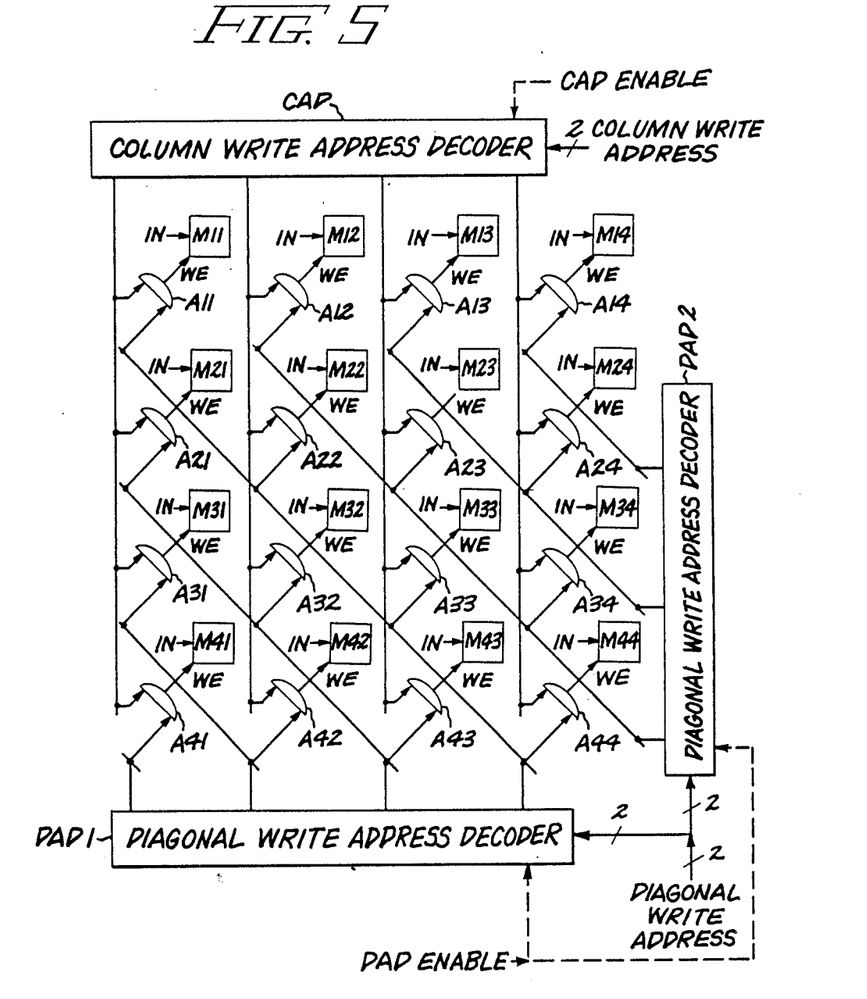

FIG. 4 shows an addressing scheme for memories M11, . . . M44 using row and diagonal partial write addresses. FIG. 5 shows an addressing scheme for memories M11, . . . M44 using column and diagonal partial write addresses. Addressing schemes using cross-diagonal partial addresses with row partial addresses or column addresses are also possible. As one skilled in the art will appreciate, other orthogonal partial address sets are also possible.

Figure 6:
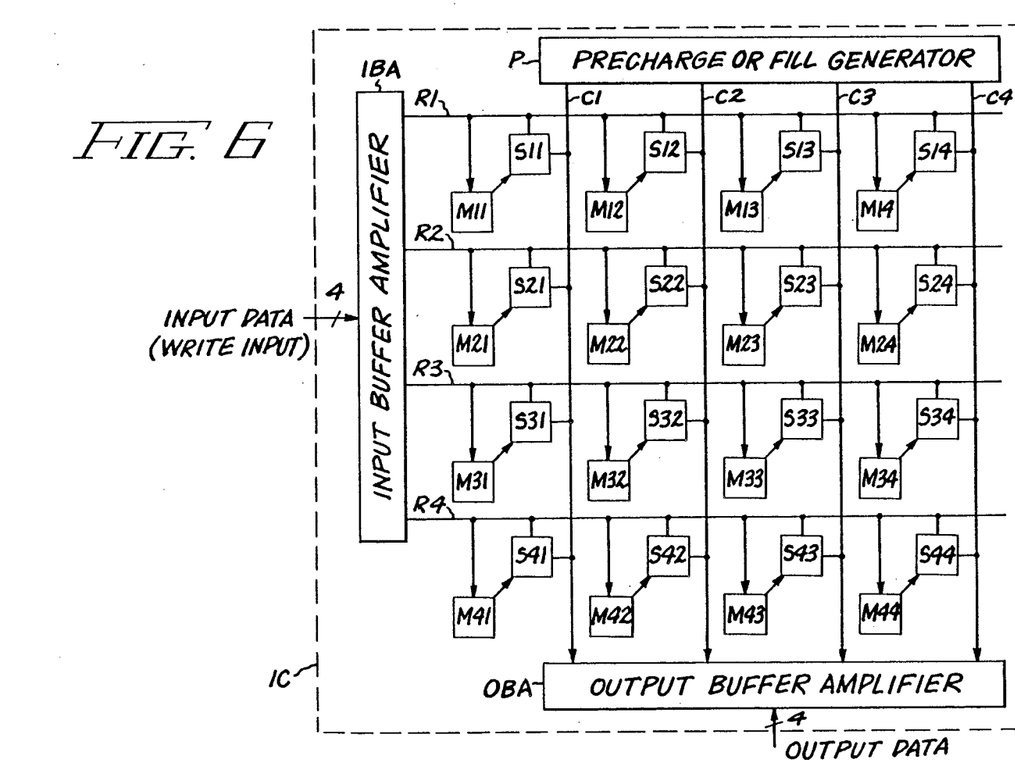
FIG. 6 is a schematic diagram of a modified arrangement to write the storage locations in the FIG. 1 memory, which in combination with the FIG. 5 way of addressing the memory provides a preferred embodiment of the invention.

FIG. 6 crossbar switch network differs from the FIG. 1 crossbar switch network which used a common write input bus to all the memories M11, . . . M44. While the FIG. 1 scheme for applying write input signals to memories M11, . . . M44 has a single pin-out, the serial writing of all the memories takes more time than writing them in parallel. When N grows from four to a large number, the slowness of this serial writing scheme becomes still more apparent and will often be unacceptable. A parallel-serial scheme for writing memories M11, . . . M44 will reduce writing time appreciably in larger crossbar switch networks. The problem is not to gain a great number of pins when implementing such a scheme.

Reflexing so that write input bits can be supplied in parallel to the monolithic integrated circuit over pins used at other times for other purposes is a solution to this problem. The FIG. 6 crossbar switch reflexes the write input bits on the four-bit input data lines.

Reflexing through the four-bit output data lines to which the output buffer amplifier OBA connects is also possible. However, in addition to disconnecting the low-impedance output port of output buffer amplifier OBA from the output data lines so they can be easily driven into by the parallel bits of a write input signal, practically speaking, provision must be made to provide buffer amplification from the output data lines to the column busses C1, C2, C3 and C4 when and only when write input signals are applied. The enabling and disabling of both output buffer amplifier OBA for output data signal and a further buffer amplifier for oppositely flowing write input signal becomes unduly complicated.

FIG. 6 reflexes the write input bits through the input data lines where the input buffer amplifier IBA can buffer them as well as input data, without need for an additional buffer amplifier or for switching between such additional buffer amplifier and the input buffer amplifier IBA during different operational modes. This reflexing scheme, it is here pointed out, affects the way that write input information may be efficiently entered in regard to the switching tasks the crossbar switch network is likely to be used for. One cannot simultaneously write a row of single-bit memories with different bit conditions. However, one can arrange to simultaneously write a column, diagonal, or cross-diagonal of single-bit memories with different bit conditions as supplied on the row busses R1, R2, R3 and R4. This is implemented by placing ONEs on the select lines for the set of partial write addresses orthogonal to the partial write address for the column, diagonal or cross-diagonal, which placement of ONEs is done by overriding the normal conditions on those select lines as determined by a partial write address decoder.

A crossbar switch network of the type shown in FIG. 6 in combination with the addressing scheme shown in FIG. 5 wherein write addresses comprises column and diagonal partial write addresses is preferred when one wishes to simultaneously write N single-bit memories during both corner-turn array operation and during barrel-shift operation. The particular connections of a representation crosspoint switch and its associated single-bit memory in such preferred embodiment of the invention is shown in FIG. 7.

Figure 7:
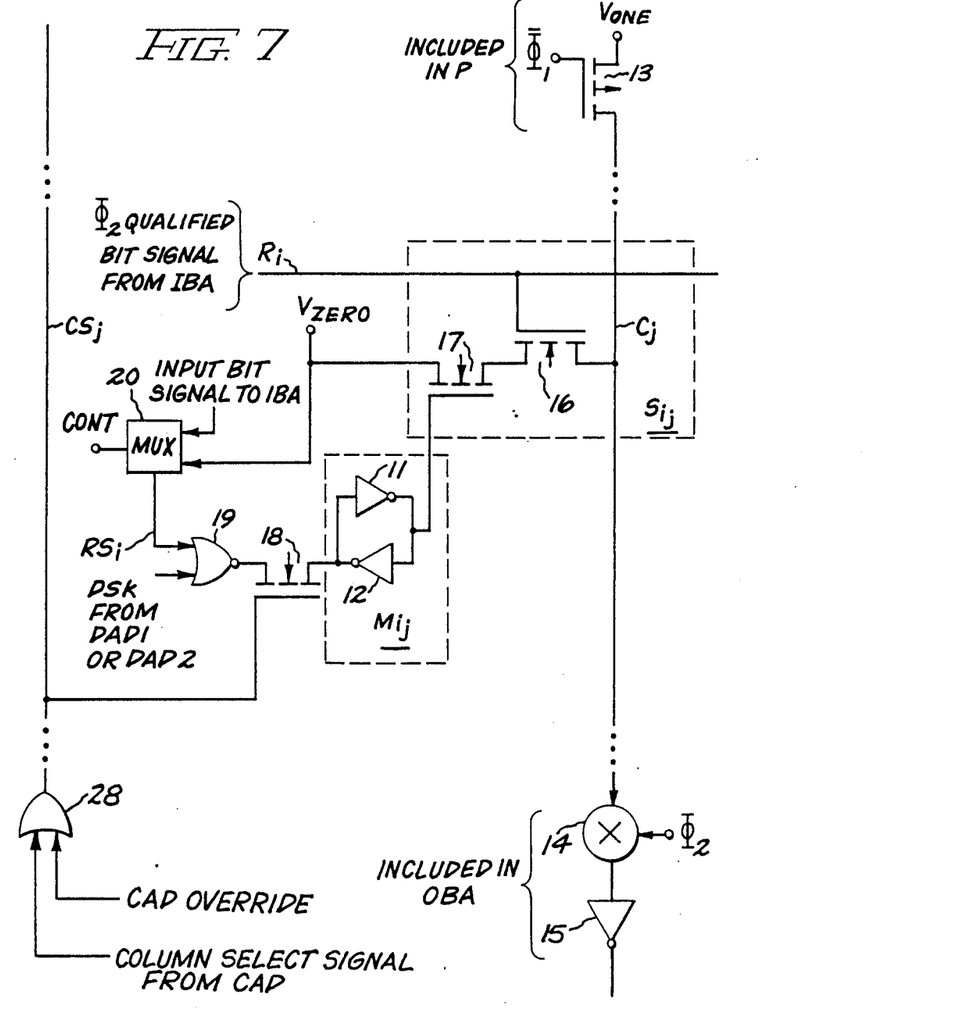
FIG. 7 is a schematic diagram of a crosspoint switch, its associated single-bit memory cell, an address logic as used in a preferred embodiment of the crossbar switch of the invention.

FIG. 7 shows a single-bit memory cell Mij that is associated with the $i^{th}$ row and $j^{th}$ column of a crossbar switch network and its associated crosspoint switch Sij. The memory cell Mij comprises two CMOS logic inverters 11 and 12 having respective output connections and having respective input connections, the input connection of each of the inverters 11 and 12 being connected from the output connection of the other, thereby to complete a regenerative feedback loop that functions as a flip-flop. Inverter 12 can be made with lower transconductance MOSFETs than inverter 11, to facilitate the writing of the flip-flop by appropriately clamping the input connection of inverter 11.

Crosspoint switch Sij is unidirectional in FIG. 7 and selectively applies to a column bus Cj running therethrough the complement of the bit supplied from input buffer amplifier 1BA to a row bus Rj running through crosspoint switch Sij. The column bus Cj is initially precharged to a ONE condition by a p-channel MOSFET 13 included in precharge generator P being rendered conductive to clamp the bus Cj to a point of voltage $V_{ONE}$, responsive to a signal $\Phi_1$ applied to the gate electrode of MOSFET 13 being pulsed negative with respect to $V_{ONE}$. $V_{ONE}$ is a positive voltage, such as +5 volts, respective to $V_{ZERO}$ or zero volts, the lowest potential in the monolithic integrated circuit ("chip ground"), to which potential $V_{ZERO}$ the gate electrode of p-channel MOSFET 13 is switched when signal $\Phi_1$ is pulsed negative. The input signal bit to row bus $R_i$ is qualified at the input buffer amplifier by a signal $\Phi_2$ rising to a ONE condition thereafter. Responsive to signal $\Phi_2$ being a ONE, the potential then appearing on column bus Cj is latched by a CMOS latch 14 at the input of a CMOS inverter 15. CMOS inverter 15 and its input datum latch 14 are included in the output buffer amplifier OBA.

More particularly, the crosspoint switch Sij comprises n-channel MOSFETs 16 and 17 in cascode connection, their channels being in series connection between column bus Cj and a point of voltage $V_{ZERO}$ (either in the order shown or in opposite order). MOSFETs 16 and 17 operate as a NAND gate for bit signals applied to their gate electrodes. The potential on the row bus Ri is applied to the gate electrode of MOSFET 16. A ONE on row bus Ri conditions the MOSFET 16 to provide a channel for conduction between its source and drain electrodes, and a ZERO on row bus Ri inhibits the formation of a channel for conduction through MOSFET 16. A ONE supplied from memory cell Mij to the gate electrode of MOSFET 17 will condition MOSFET 17 to provide a channel for conduction between its source and drain electrodes. If ONEs are applied to the gate electrode of both MOSFETs 16 and 17, conditioning both to provide channels for conduction, the column bus Cj will be clamped to $V_{ZERO}$. The ZERO on column bus Cj is latched to the input port of inverter 15 when latch 14 responds to $\Phi_2$ being a ONE; and inverter 15 responds to the ZERO at its input port with a ONE at its output port, which ONE corresponds to the ONE on row bus Ri. If memory cell Mij applies a ONE to the gate electrode of MOSFET 17, but row bus Ri applies a ZERO to the gate electrode of MOSFET 16, the resulting inhibition of conduction through MOSFET 16 will permit column bus Cj to remain at its pre-charge ONE condition. This ONE is latched to the input port of inverter 15 when latch 14 responds to $\Phi_2$ being a ONE; and inverter 15 responds to the ONE at its input port to supply a ZERO at its output port, which ZERO corresponds to the ZERO on row bus Ri.

If memory cell Mij applies a ZERO to the gate electrode of MOSFET 17, the resulting inhibition of conduction through MOSFET 17 will permit column bus Cj to remain at its pre-charge ONE condition, irrespective of the bit signal applied to the gate electrode of MOSFET 16 via row bus Ri. This ONE is latched to the input port of inverter 15 when latch 14 responds to $\Phi_2$ being a ONE; and inverter responds to the ONE at its input port to supply a ZERO at its output port irrespective of whether a ONE or ZERO appeared on row bus Ri.

One should appreciate then that, if on the one hand memory cell Mij supplies a ONE at its output connection to the crosspoint switch Sij, crosspoint switch Sij is operative to "connect" row bus Ri to the output port of inverter 15. That is, the Cj column output at the output port of inverter 15 responds to the bit signal on row bus Ri. On the other hand, if memory cell Mij supplies a ZERO at its output connection to crosspoint switch Sij, crosspoint switch Sij is operative to "disconnect" row bus Ri from the output port of inverter 15. That is, the Cj column output at the output port of inverter 15 does not respond to the bit signal on row bus Ri, but rather is in a ZERO fill condition responsive to pre-charge. One may ascertain row-by-row the content of the array of memory cells including Mij by entering a succession of numbers that are each ZERO in all bit places except that associated with a selected row and noting the output buffer amplifier OBA response. One's concern now should be with how the content of the memory cell Mij is written or rewritten.

The content of the memory cell Mij which is to appear at its output connection from the output port of inverter 11 to the crosspoint switch Sij is written in complementary form at the input connection to memory cell Mij, at the interconnection of the output port of inverter 12 and the input port of inverter 11. Memory cell Mij is written (or re-written) responsive to an n-channel MOSFET 18 receiving at its gate electrode a ONE supplied via a column select line CSj, which ONE conditions MOSFET 18 to provide a channel for conduction between its drain electrode at the input connection of memory cell Mij and its source electrode, which connects to the output port of a NOR gate 19. If column select line CSj supplies a ZERO to the gate electrode of MOSFET 18, conduction through a MOSFET 18 channel is inhibited and the content of memory cell Mij is not altered by writing, or re-writing.

FIG. 7 shows each column select line CSj receives the ONE or ZERO thereon from the output port of respective OR gate 28, which selectively responds to a respective decoder column select signal supplied from a column write address decoder CAD, not shown in FIG. 7, but as shown in FIG. 5. The gate electrode of MOSFET 18 receives response to the column select signal from the column address decoder CAD as long as the CAD override signal supplied as another input signal to OR gate 28 is a ZERO. If the CAD override signal is a ONE, which can occur during certain modes of circuit operation (namely, barrel shifting), OR gate supplies a ONE to MOSFET 18 gate electrode conditioning it for clamp to permit writing or re-writing of memory cell Mij irrespective of whether column select signal from the column address decoder CAD is a ONE or a ZERO.

NOR gate 19 has two input ports connected to a row select line RSi and to a diagonal select line DSk where k is a number dependent upon i and j, in a way that should be apparent from FIG. 5. The diagonal select line DSk is supplied a ZERO or a ONE from one of the diagonal write address decoders DAD1 and DAD2, not shown in FIG. 7, but shown in FIG. 5. The row select line RSi is not supplied from a row address decoder if the addressing scheme for memory cells is essentially of the sort shown in FIG. 5, as assumed in FIG. 7 to be the case. Instead, multiplexer 20 for the FIG. 7 crosspoint responds to a control signal CONT being a ZERO or a ONE to determine whether the row select line RSi connects to $V_{ZERO}$ or connects to the bit signal input of that portion of the input buffer amplifier IBA which qualifies a corresponding bit signal to the row bus Ri when $\Phi_2$ signal goes high. Corresponding multiplexers 20 for the crosspoints not shown in FIG. 7 respond analogously to control signal CONT. Each multiplexer 20 typically comprises a pair of enhancement-mode field-effect transistors of complementary conductivity type respnding to control signal CONT applied to their gate electrodes, one to selectively conduct to apply $V_{ZERO}$ to row select line RSi and the other to selectively conduct to connect the row bus Ri to the row select line RSi.

The FIG. 7 multiplexer 20 and corresponding multiplexers 20 associated with the other crosspoints are conditioned to place input bit signal for each row in its associated row select line—e.g., by control signal CONT being a ONE—when the crossbar switch is to be used as a corner-turn array. A corner-turn array takes a square matrix of bit values and rotates it one-quarter turn. Diagonal write address decoders DAD1 and DAD2 are inhibited in their operation, so a ZERO appears on every diagonal select line; then the column write address decoder CAD is fed a sequence of codes to sequentially place a ONE on each successive column select line at the same clock rate as input data are clocked in. This operation writes a bit map into the memory cells including Mij. Thereafter, the column write address decoder CAD is not enabled in its operation, so all column select lines receive respective ZEROs. This conditions the memory cells retain the bit map, and the input buffer amplifier IBA is supplied a succession of binary numbers that are consecutive integral powers of two—that is, are each ZERO in all bit places except one and include a single ONE that scans a respective row of the bit map to the column busses. Making the successive integral powers of two progressively larger rotates the bit matrix a quarter-turn one way; making them progressively smaller rotates the bit matrix a quarter turn the opposite way.

When barrel shift or crossbar switch operations are to be implemented, control signal CONT has a state —e.g., ZERO—that conditions the multiplexers 20 to select $V_{ZERO}$ to the row select lines including RSi, placing a ZERO on each of the row select lines. NOR gate 19 for the FIG. 7 crosspoint responds to the ZERO on its row select line RSi to complement the bit applied to its diagonal select line DSk, and the NOR gates 19 for the other crosspoints respond in an analogous manner. All diagonal select lines that are not selected by diagonal write address decoders DAD1 and DAD2 receive ZEROs, so the NOR gates 19 connected to them output a ONE. MOSFETs 18 clamping memory cell input connections to these ONEs write (or re-write) these memory cells to supply ZEROs at their output connections. Accordingly, the crosspoint switches associated with these memory cells are inoperative to change conditions on their respective column signal busses. Each diagonal select line that is selected by the diagonal write address generators DAD1 and DAD2 receives a ONE, so each NOR gate 19 connected to its outputs a ZERO. MOSFETs 18 clamping memory cell input connections to these ZEROs write (or re-write) these memory cells to supply ONEs at their output connections, so the crosspoint switch associated with these memory cells are operative to impose on the column busses respectively associated with these crosspoint switches the complements of the bits on the row signal busses respectively associated with these crosspoint switches.

In crossbar switch operation the crosspoint array of the invention typically has sixty-four rows by sixty-four columns of crosspoint switches. By way of example, the 64-bit-write input buffer amplifier servicing the sixty-four rows of crosspoint switches receives two 32-bit-wide input signals in parallel, and the 64-bit-wide buffer amplifier associated with the sixty-four columns of crosspoint switches supplies two 32-bit-wide output signals in parallel. Each 32-bit-wide output signal may be selected from either one of the 32-bit-wide input signals. Each crossbar switch as thus far described may be connected as one of an array of similar crossbar switches to provide for a larger interconnection network. (Alternatively, the buffer amplifiers of the 64-row-by-64-column array of crosspoint switches may each handle four 16-bit-wide signals, or eight 8-bit-wide signals.) The manner of making interconnections of crossbar switches into networks is well known having been extensively developed in the art of telephony.

The crossbar connections are programmed by addressing the diagonal select line of the crosspoint switches where the column signal busses for generating the output signal cross the row signal busses on which the bits of the input signal selected for that output signal appears, then successively addressing the column select lines associated with those column busses. Multiplexer 20 at each crosspoint selects a ZERO to the RSi input of its associated NOR gate 19. Barrel shifting can be done more rapidly without successively addressing the column select lines by applying a ONE as CAD override signal to OR gate 28 rather than the ZERO applied during programming other types of crossbar connections.

The column write address decoder CAD can be modified to output ONEs to all column select lines without having to insert an OR gate 28 in each column select line to provide for overriding CAD output, and this modification saves a considerable number of OR gates in the digital hardware. The column write address decoder may be modified so as to supply ONEs just to any one of a set of word-sized groups of adjacent column select lines, so the programming of memory cells associated with that group of column select lines can selectively be done in parallel.

Figure 8:
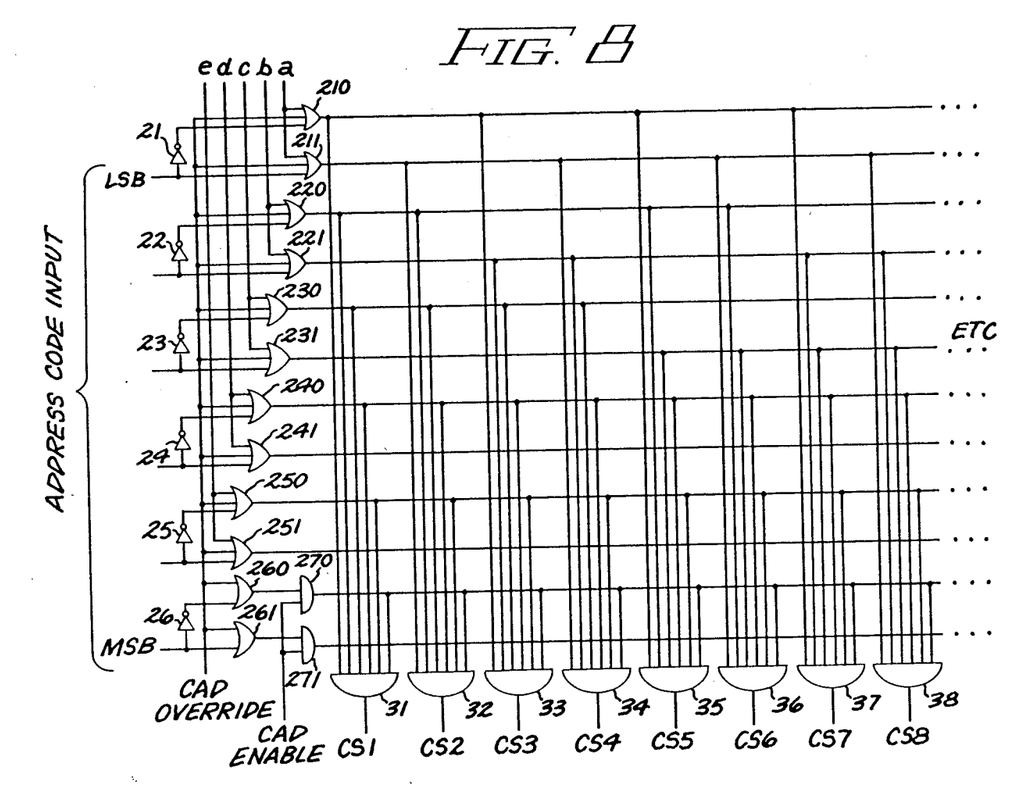
FIG. 8 is a schematic diagram of a portion of a column write address decoder as may be used in certain crossbar switches embodying the invention.

FIG. 8 shows a portion of a column write address decoder for a 64-crosspoint-by-64 crosspoint crossbar switch, in which decoder the number of column select lines receiving a ONE responsive to a column write address code can be selected by application of appropriate logic levels at decoder control lines a, b, c, d and e. The bits of a six-bit column write address code and their complements as generated by logic inverters 21–26 are conditionally applied to six pairs of code bit busses, rather than unconditionally as in an unmodified address decoder. OR gates 210, 211, 220, 221, 230, 231, 240, 241, 250, 251, 260 and 261 are the modification to the column write address decoder that introduces this conditionality of application.

Each of the OR gates 210, 211, 220, 221, 230, 231, 240, 241, 250, 251, 260, 261 receives a CAD override signal as one of its signals and responds with a ONE at its output signal to the CAD override signal being a ONE. Supposing a CAD enable signal that is ONE is applied to AND gates 270 and 271, the ONEs from the OR gates appear on all code bit busses and conditions all of the AND gates 31–38 (shown) and 39–44 (not shown) to decode a ONE to the one of the column select lines CS1–CS64 with which that AND gate is associated. OR gates 28 are eliminated in effect, saving some fifty-two two-input OR gates. The all ONEs condition on the column select lines CS1–CS64 is used during barrel shifting over the entire width of the input data as described above. In the description of operation to follow CAD override signal and CAD enable signal will be assumed to be ZERO and ONE respectively.

If the decoder control lines a, b, c, d and e all receive ZEROs the condition is satisfied for all pairs of code bit busses, and one of AND gates 31–38 (shown) and 39–94 (not shown) decodes a ONE to the one of column select lines CS1–CS64 with which that AND gate is associated. The others of AND gates 31–94 decode a ZERO to the column select lines respectively associated with them. So individual columns of memory cells in the crossbar switch are addressed by each of the $2^6$ column write address codes, just as in the unmodified column write address decoder.

If decoder control line a has a ONE applied thereto and decoder input lines b, c, d and e have ZEROs applied thereto, the least significant bit of the column write address code and its complement do not control the bit conditions on the paired two uppermost code bit busses, which bit conditions are ONE because decoder input line a has a ONE thereon. Column select lines are selected on a pairwise basis responsive to the five most significant bits of the column write address code.

Suppose each of decoder control lines a and b has a ONE applied to it and each of decoder control lines c, d and e has a ZERO applied to it. Then column select lines are selected in groups of four responsive to the four most significant bits of the column write address code.

Suppose each of decoder lines a, b and c has a ONE applied to it and each of decoder control lines d and c has a ZERO applied to it. Then column select lines are selected in groups of eight responsive to the three most significant bits of the column write address code.

Suppose decoder control line e is the only one that has a ZERO applied to it, the others having ONEs applied to them. Then column select lines are selected in groups of sixteen responsive to the two most significant bits of the column write address code.

Suppose each of the decoder control lines a, b, c, d and e has a ONE applied thereto. Then column select lines are selected in groups of thirty-two responsive only to the most significant bit of the column write address code.

The foregoing operations take place only as long as the CAD ENABLE signal supplied to each of the AND gates 270 and 271 is a ONE. If CAD ENABLE goes to ZERO, ZERO response of AND gate 270 is supplied to the AND gates 31–62 to condition them to apply ZEROs to their respective column select lines, and the ZERO response of AND gate 271 is applied to the AND gates 63–94 to condition them to apply ZEROs to their respective column select lines. So all the column select lines have ZEROs thereon, and the FIG. 8 column write address decoder is disabled.

Figure 9:
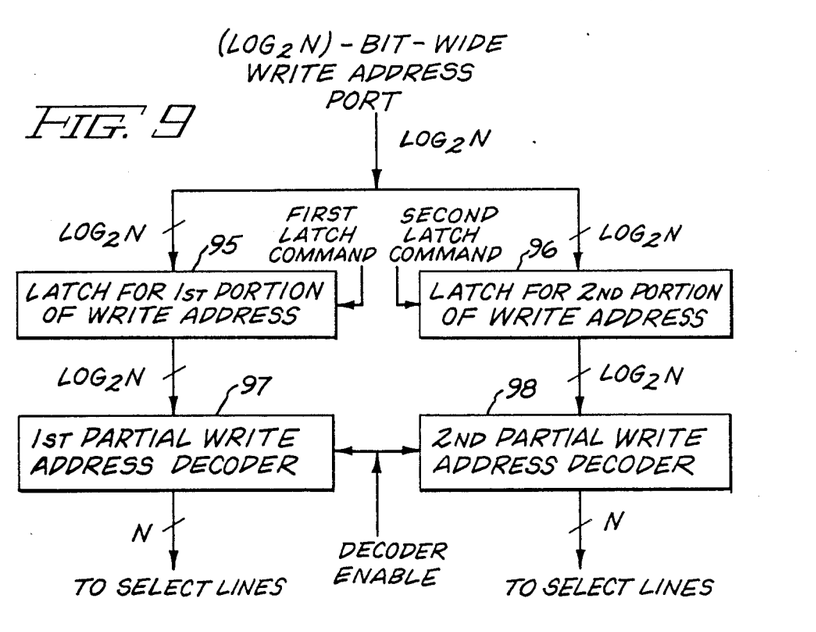
FIG. 9 is a schematic diagram of apparatus for addressing a crossbar switch with memory on a time-division-multiplex basis as done in certain embodiments of the invention.

FIG. 9 shows a way for reducing the number of pins for introducing write addresses into the monolithically integrated crossbar switch with control memory. The first and second partial write addresses comprising each full write address are successively supplied, each in parallel-bit form, via $\log_2 N$ write address input pins to the ($\log_2 N$)-bit-wide input ports of latches 95 and 96. Latch 95 receives a first latch command concurrent with the first partial write address being supplied to the input ports of latches 95 and 96 via the ($\log_2 N$)-bit-wide write address port, which first latch command conditions latch 95 to temporarily store that particular first partial write address and supply that first partial write address from its output port to the input port of a first partial write address decoder 97. After the first partial write address is supplied and latch 95 receives its first latch command, a second partial write address is supplied to the ($\log_2 N$)-bit-wide write address port. Latch 96 receives a second latch command concurrent with the second partial write address being supplied to the input ports of latches 95 and 96 via the ($\log_2 N$)-bit-wide write address port, which second latch command conditions latch 26 to temporarily store that second partial write address and supply it to the input port of a second partial address decoder 98.

Figure 10:
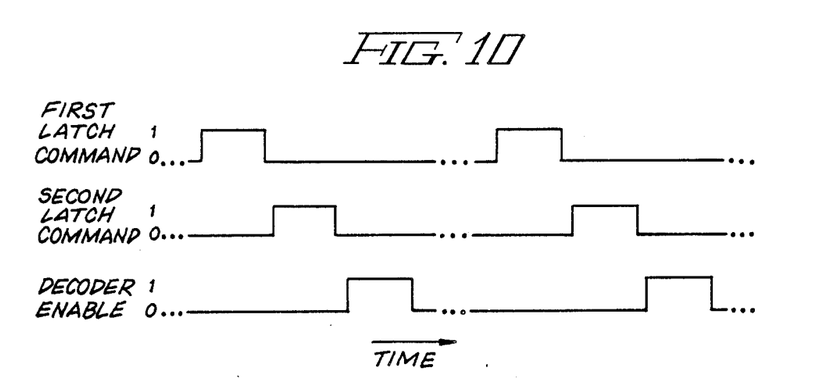
FIG. 10 is a timing diagram for the FIG. 9 apparatus.

FIG. 10 illustrates the timing of the first and second latch commands, each effective on a ONE to ZERO transition.

Then, as shown in FIG. 10, when the full write address is available to the first and second partial write address decoders 97 and 98, a decoder enable signal is caused to be ONE. This decoder enable signal supplied to both decoders 97 and 98 enables them to decode the first and second partial write addresses, respectively, so each may select a ONE to one of a respective set of select lines and ZERO to the others, to select the memory storage location to be re-written.

Thusfar, the number of output ports to the crossbar switch has been considered to be the same as the number, N, of input ports to the crossbar switch. However, the number of output ports may be M, a number that may be different from N. In any case, in an M column by N row array of crosspoint switches, the number of full diagonals of crosspoint switches is $(B-S+1)$ and the number of partial diagonals of crosspoint switches is $(S-1)$, where B is the larger of M and N supposing M and N not to be equal, where S is the smaller of M and N supposing M and N not to be equal, and where B and S correspond to separate ones of M and N supposing them to be equal. The number M of output ports may be smaller than the number N of input ports—e.g., where the crossbar switch is used to select M bits of data from a N-bit-wide trunk carrying data for a number of different users. The number M of output ports may be larger than the number N of input ports—e.g., where the crossbar switch is used to barrel-shift N bits of data as preceded by a prefix string of ZEROs or sign bits and as succeeded by a suffix string of ZEROs, which can be done in serially multiplying using accumulation. Where M and N differ, a crossbar switch embodying the invention will have a memory with $M \times N$ single-bit storage locations for respectively controlling the $M \times N$ crosspoint switches. The memory can be addressed with no more than $\log_2 MN$ bits—i.e., with $\log_2 M$ plus $\log_2 N$ bits—supposing the addresses not to be time-division multiplexed.

The use of only $\log_2 MN$ bits to address MN memories during the writing thereof presumes that each of MN is an integer power of two. Where M is not an integer power of two, $\log_2 PN$ bits are required to address the MN memory storage locations where P is the first integer power of two above M. Where N is not an integer power of two, $\log_2 MQ$ bits are required to address them MN memory storage locations, where Q is the first integer power of two above N. Where neither M or N is an integer power of two, $\log_2 PQ$ bits are required to cross-address the MN memory storage locations using a write address separable into orthogonal partial addresses. Also, instead of using write address decoder enable signals, one may wish to use one blind write address that has no memory or crosspoint switch associated therewith. In such instances one or both of the orthogonal first and second portions of the memory write addresses may include an extra bit and are to be considered as together substantially having no more than $\log_2 MN$ bits.

While only certain preferred features of the invention have been illustrated and described herein, many modifications and changes will occur to those skilled in the art and acquainted with the foregoing disclosure. It is, therefore, to be understood that the appended claims are intended to cover all such modifications and changes as fall within the true spirit of the invention.

What is claimed is:

1. In a crossbar switch of the type including within the confines of a single monolithic integrated circuit a plurality MN in number of crosspoint switch means for selectively connecting a plurality M in number of output ports each to receive signal from one of a plurality N in number of input ports, and semiconductor memory for storing control signals determining which of said crosspoint switch means shall so selectively connect, said semiconductor memory including a plurality MN in number of single-bit storage locations in said semiconductor memory, each of said single-bit storage locations associated with a respective one of said MN crosspoint switch means for storing the control signal for that respective one crosspoint switch means, each of said crosspoint switch means associated with one of said M output ports and one of said N input ports, and no two of said crosspoint switch means being associated with both the same input port and the same output port, M and N each being a respective positive integer, the improvement comprising:

means responding to respective ones of write addresses for selecting for re-writing ones of said single-bit storage locations in said semiconductor memory specified by those write addresses; and means for re-writing the semiconductor memory location associated with each crosspoint switch means using bits as applied to the one of said input ports also associated with that crosspoint switch means.

2. An improved crossbar switch as set forth in claim 1 wherein M and N are both the same positive integer.

3. An improved crossbar switch as set forth in claim 2 wherein said means for selecting for re-writing includes:
   a decoder responding to each said write address for selecting for re-writing a respective group of N storage locations in said semiconductor memory that are associated with N crosspoint switch means all of which are associated with the same output port.

4. An improved crossbar switch as set forth in claim 3 arranged for operation as a corner turn array.

5. An improved crossbar switch as set forth in claim 1 wherein said write addresses each comprise a first portion of $\log_2 M$ bit width and a second portion of $\log_2 N$ bit width, and wherein said means for selecting for re-writing includes:
   a first decoder responding to the first portion of each said write address to conditionally select for re-writing M of said MN storage locations in said semiconductor memory, and
   a second decoder responding to the second portion of each said write address to conditionally select for re-writing N of said MN storage locations in said semiconductor memory, said first and second portions of said write addresses providing orthogonal descriptions of conditional selection for re-writing whereby a single one of said MN storage locations is selected for re-writing at any time.

6. An improved cross-bar switch as set forth in claim 5 wherein the semiconductor memory location associated with each crosspoint switch is re-written with bits applied to the one of said input ports also associated with that crosspoint switch.

7. An improved crossbar switch as set forth in claim 5 wherein the first and second portions of said write addresses are supplied on a time-division multiplexed basis to said monolithic integrated circuit and wherein said means for selecting for re-writing further includes:
   means for latching said first portions of write addresses to said first decoder; and
   means for latching said second portions of write addresses to said second decoder.

8. An improved crossbar switch as set forth in claim 1 wherein said means for selecting for re-writing includes:
   a decoder responding to each said write address for selecting for re-writing to a respective one of M groups of N storage locations in said semiconductor memory, the N storage locations in each group being associated with N crosspoint switch means each of which is associated with a different output port.

9. An improved crossbar switch as set forth in claim 8 arranged for operation as a barrel shifter.

10. A crossbar switch including, within the confines of a single monolithic integrated circuit;
   a plurality, M in number, of output-data bit terminals for making off-circuit connections from, M being an integer at least two;
   a plurality, M in number, of output data lines;
   means for applying output data bits to said output data bit terminals from respective ones of said output data lines;
   a plurality, N in number, of input-data bit terminals for making off-circuit connections to, N being an integer at least two;
   a plurality, N in number, of input data lines;
   means for applying at selected times input data bits received at each of said input data bit terminals to respective ones of said input data lines;
   a plurality of crosspoint switches, MN in number, each selectively connecting an associated one of said input data lines to an associated one of said output lines in response to a respective single-bit control signal and none selectively connecting together the same input data and output data lines as any other of said crosspoint switches;
   a memory having MN single-bit storage locations, each for storing a respective bit providing the single-bit control signal for a respective associated one of said plurality of crosspoint switches, wherein said plurality of crosspoint switches and the respective single-bit storage locations of said memory controlling them are in effect arrayed by row and by column in M parallel columns and N parallel rows of an $M \times N$ rectangular array having at least one full diagonal for addressing purposes and having partial diagonals that are combined to form additional diagonals for addressing purposes;
   means responding to each of a plurality of write addresses, as supplied to a set of memory-control bit terminals, for selecting which of said single-bit storage locations are to be re-written, including
   a first decoder responding to a respective first portion of each said write address to conditionally select certain of said MN single-bit storage locations, and
   a second decoder responding to a respective second portion of said write address to conditionally select certain of said MN single-bit storage locations, the first and second portions of said write addresses being orthogonal to each other for selecting a respective single-bit storage location to be rewritten for each write address supplied to said means for selecting, the first and second portions of each said write address together substantially having no more than $\log_2 MN$ bits; and
   means for re-writing said single-bit storage locations selected for re-writing.

11. A crossbar switch as set forth in claim 10 wherein said first and second potions of each write address respectively are a column write address portion substantially having no more than $\log_2 M$ bits and a row write address portion substantially having no more than $\log_2 N$ bits.

12. A crossbar switch as set forth in claim 10 wherein said first portion of each write address is a column write address portion substantially having no more than $\log_2 M$ bits and wherein said second portion of each write address is a diagonal write address portion.

13. A crossbar switch as set forth in claim 10 wherein said first portion of each write address is a row write address portion substantially having no more than $\log_2 N$ bits and wherein said second portion of each write address is a diagonal write address portion.

14. A crossbar switch including, within the confines of a single monolithic integrated circuit;

a plurality, M in number, of output-data bit terminals for making off-circuit connections from, M being an integer at least two;

a plurality, M in number, of output data lines;

means for applying output data bits to said output data bit terminals from respective ones of said output data lines;

a plurality, N in number, of input-data bit terminals for making off-circuit connections to, N being an integer at least two;

a plurality, N in number, of input data lines;

means for applying at selected times input data bits received at each of said input data bit terminals to respective ones of said input data lines;

a plurality of crosspoint switches, MN in number, each selectively connecting an associated one of said input data lines to an associated one of said output lines in response to a respective single-bit control signal and none selectively connecting together the same input data and output data lines as any other of said crosspoint switches;

a memory having MN single-bit storage locations, each for storing a respective bit providing the single-bit control signal for a respective associated one of said plurality of crosspoint switches, wherein said plurality of crosspoint switches and the respective single-bit storage locations of said memory controlling them are in effect arrayed by row and by column in M parallel columns and N parallel rows of an M×N rectangular array having at least one full diagonal and having partial diagonals that are combined to form additional diagonals;

means responding to each of a plurality of write addresses, as supplied to a set of memory-control bit terminals, for selecting which of said single-bit storage locations are to be re-written, including a first decoder responding to a respective first portion of each said write address to conditionally select a certain one of said full and additional diagonals of said MN single-bit storage locations, and a second decoder responding to a respective second portion of said write address to conditionally select certain of said MN single-bit storage locations, the first and second portions of said write addresses being orthogonal to each other for selecting a respective single-bit storage location to be rewritten for each write address supplied to said means for selecting, the first and second portions of each said write address together substantially having no more than $\log_2$ MN bits; and means for re-writing said single-bit storage locations selected for re-writing.

15. A crossbar switch as set forth in claim 14 wherein M and N are both the same integer.

16. A crossbar switch as set forth in claim 14 wherein said second portion of each write address is a cross-diagonal write address portion.

17. A crossbar switch as set forth in claim 14 wherein said second portion of each write address is a row write address portion.

18. A crossbar switch as set forth in claim 14 wherein said second portion of each write address is a column write address portion.

19. A crossbar switch as set forth in claim 14 wherein each of said crosspoint switches comprises:

a NAND gate having a first input connection to one of said input data lines, having a second input connection for receiving one of said single-bit control signals, and having an output connection to one of said output data lines.

20. A crossbar switch as set forth in claim 19 wherein said means for applying output data bits to said output data bit terminals from respective ones of said output data lines comprises:

a respective logic-inverting amplifier for each said output data line having an input connection and having an output connection to a respective one of said output data bit terminals; and a respective latch circuit for each said output data line having an input connection from its output data line and having an output connection to the input connection of the respective logic-inverting amplifier of its output data line, for latching the bits appearing on its output data line during said selected times.

21. A crossbar switch as set forth in claim 20 comprising:

means for pre-charging each of said output data lines to a voltage level associated with a first logic condition previously to each said selected time.

22. A crossbar switch as set forth in claim 14 comprising:

means for pre-charging each of said output data lines to a voltage level associated with a first logic condition previously to each said selected time.

23. A crossbar switch including, within the confines of a single monolithic integrated circuit;

a plurality, M in number, of output-data bit terminals for making off-circuit connections from, M being an integer at least two;

a plurality, M in number, of output data lines;

means for applying output data bits to said output data bit terminals from respective ones of said output data lines;

a plurality, N in number, of input-data bit terminals for making off-circuit connections to, N being an integer at least two;

a plurality, N in number, of input data lines;

means for applying at selected times input data bits received at each of said input data bit terminals to respective ones of said input data lines;

a plurality of crosspoint switches, MN in number, each selectively connecting an associated one of said input data lines to an associated one of said output lines in response to a respective single-bit control signal and none selectively connecting together the same input data and output data lines as any other of said crosspoint switches;

a memory having MN single-bit storage locations, each for storing a respective bit providing the single-bit control signal for a respective associated one of said plurality of crosspoint switches;

means responding to each of a plurality of write addresses, as supplied to a set of memory-control bit terminals, for selecting which of said single-bit storage locations are to be re-written; and means for re-writing and single-bit storage locations selected for re-writing, wherein said means for re-writing is of a type for re-writing memory storage locations with bits supplied from the ones of said input-data terminals to which connect the respective input data lines associated with the same crosspoint switches as those memory locations.

24. A crossbar switch as set forth in claim 23 wherein said plurality of crosspoint switches and the respective single-bit storage locations of said memory controlling them are in effect arrayed by row and by column in M parallel columms and N parallel rows of an M×N rectangular array having at least one full diagonal and having partial diagonals that are combined to form additional diagonals.

25. A crossbar switch as set forth in claim 24 wherein M and N are both the same integer.

26. A crossbar switch as set forth in claim 25 wherein said means for selecting which of said single-bit storage locations are to be re-written comprises:
a decoder responding to each said write address for selecting the single-bit storage locations associated with the crosspoint switches in a respective column to be re-written.

27. A crossbar switch as set forth in claim 26 arranged to operate as a corner-turn array.

28. A crossbar switch as set forth in claim 25 wherein said means for selecting which of said single-bit storage locations are to be re-written comprises:
a decoder responding to each write address for selecting the single-bit storage locations associated with the crosspoint switches in a respective diagonal.

29. A crossbar switch as set forth in claim 28 arranged to operate as a barrel decoder.

30. In a memory comprising a plurality MN in number of single-bit storage cells arranged in M columns and N rows, served by diagonal select lines along (B−S+1) full diagonals and first and second sets of (S−1) partial diagonals, where B is the bigger of positive integers M and N in cases where M and N are not equal to each other, where S is the smaller of positive integers M and N in said cases where M and N are not equal to each other, and where B and S are respective ones of the positive integers M and N in cases where M and N are equal to each other, improved means for diagonally addressing said single-bit storage cells to avoid need for (S−1) connections between select lines serving pairs of partial diagonals, said improved means comprising:
first address decoder means responding to each of a plurality of diagonal addresses to select single-bit storage cells served by a select line along one of said (B−S+1) full diagonals and said first set of (S−1) partial diagonals, which select line is associated with a particular one of said plurality of diagonal addresses; and
second address decoder means responding to each diagonal address not associated with a select line along one of said (B−S+1) full diagonals to select single-bit storage cells served by a select line along an associated one of said second set of (S−1) partial diagonals that together with the select line along the one of said first set of (S−1) partial diagonals associated with the same address serves S single-bit storage cells.

31. An improvement as set forth in claim 30 wherein M=N.

32. An improvement as set forth in claim 30 wherein said diagonal select lines are partial select lines and said single-bit storage cells are served with further partial select lines to permit their being cross-addressed.

* * * * *